Sept. 25, 1956 J. A. BUSH 2,764,738
MODULATION CORRECTOR
Filed Dec. 22, 1952
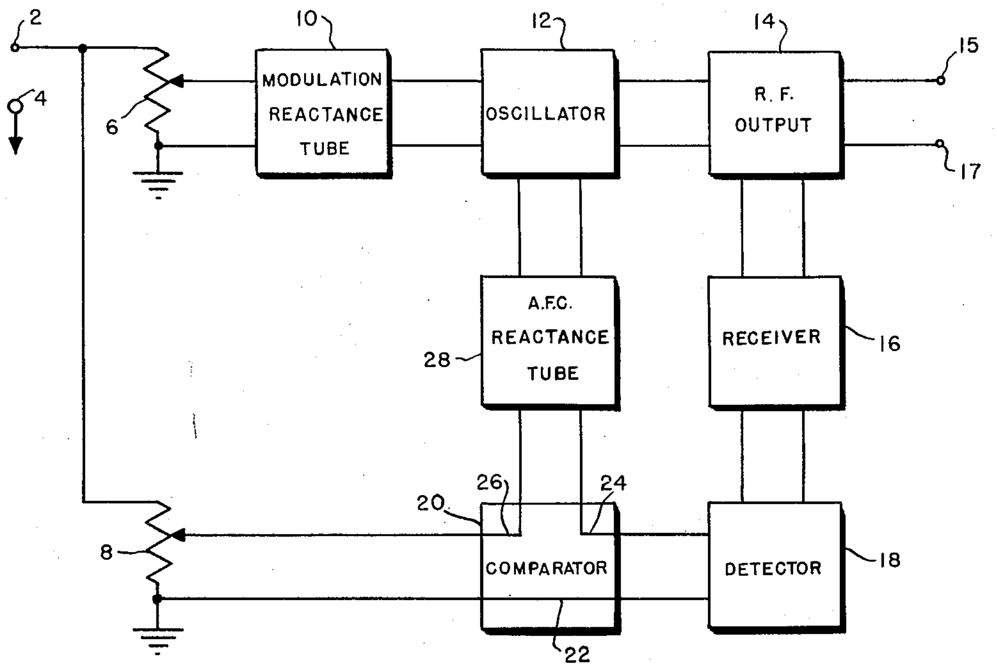
INVENTOR.
JOHN A. BUSH
BY Harry M. Saragovitz
Attorney

1

2,764,738

MODULATION CORRECTOR

John A. Bush, Red Bank, N. J., assignor to the United States of America as represented by the Secretary of the Army Application December 22, 1952, Serial No. 327,461

1 Claim. (Cl. 332—18)

(Granted under Title 35, U. S. Code (1952), sec. 266)

The invention described herein may be manufactured and used by or for the Government for governmental purposes, without the payment of any royalty thereon.

This invention relates to modulation correction and more particularly to a system for compensating for any differences between the signal of the modulating source and the signal as it is detected after modulation.

There are several systems for frequency control or stabilization at a radio frequency level and there are several systems utilizing feedback for reducing the distortion of an amplified audio signal, but an undistorted modulating signal of audio frequency and a stabilized source of radio frequency energy still do not insure an undistorted modulation component.

Conventional forms of negative feedback applied from a detected sample of the output signal to the input signal are helpful but only reduce distortion to a limited degree. A system might be used for distorting the input signal to compensate for distortions that occur in the process of modulation but this is considered undesirable for other reasons.

This invention relates to a circuit for modulating a carrier frequency, sampling the output of the modulator to obtain the modulation envelope as it will be received in a conventional receiving instrument, and comparing the output modulation component with the input modulating signal at the same level to obtain the differential between the two. Any variation from an absolute symmetry between the output and the input will appear at this differential and is applied to supermodulate the carrier positively or negatively to alter the carrier modulation to exactly compensate for any errors introduced.

It is an object of this invention to reduce the distortion in a modulated signal.

It is a further object of this invention to correct for errors introduced in the course of modulating a carrier frequency.

It is a further object of this invention to produce a transmitted signal whose modulation is substantially identical to the original modulating signal.

Other and further objects of this invention will become apparent from the following specification and the drawing which shows a typical interconnection of elements of the invention in block diagram form.

Referring to the drawing, an input signal is applied across the terminals 2 and 4; the signal may be a single sided audio frequency voltage and terminal 4 may be grounded. The input signal from the other terminal is applied across the potentiometers 6 and 8 which are used to control the level of the input signal to be applied. The signal from potentiometer 6 is applied to a modulation reactance tube 10 which controls the frequency of the oscillator 12 according to well known modulation techniques. In this case the oscillator will be frequency modulated although, as will become apparent later, this system in basic concept applies equally well to any other form of modulation. The output of the oscillator can

2 be amplified in the normal manner in the RF output section 14. Several stages of amplification may be used or frequency multipliers may be inserted here to reach the desired output frequency.

The output across terminals 15 and 17 can be applied to an antenna or conventional output system in a normal manner. In applicant's device the RF output is also taken from the output of 14 and applied to a receiver 16 to be detected at 18. This receiver and detector may be a conventional radio receiver or other form of detecting means normally employed in monitoring circuits.

The output of the detector 18 is applied to a comparator 20 along with a sample of the input voltage taken from potentiometer 8. These two voltages are added together out of phase to produce a resultant that is the differential between the voltages. In the connections shown here a common line 22 is grounded and the voltages across 24 and 22 and across 26 and 22 are in phase. As long as the voltage across 24 and 22 is a mirror image or an exact duplicate of the voltage across 26 and 22, no resultant voltage appears across the terminals 24 and 26. However, any distortion of any type such as amplitude, phase, harmonic or intermodulation will appear as a differential voltage. This is applied to a second reactance tube 28 which additionally modulates the oscillator 12.

This system operates to produce a carrier whose modulations—as they will be received—are an exact duplicate in every respect of the modulating signal. Had there been any difference it would have been exactly compensated by the correcting network disclosed here.

While the form of supermodulation discussed in the above embodiment of this invention utilizes reactance tubes as will be the case in frequency modulation it is obvious that the basic system of modulation correction by supermodulation is applicable to any other form of modulation. In all cases the input signal is modulated as in 10 by a device or circuit suitable to produce the desired form of modulation whether it be amplitude modulation, phase modulation, frequency modulation, etc. The modulated carrier is then amplified and brought in a conventional way to the final output as at 14 which may be the final output stage of a transmitter or the antenna itself. In any case the modulated output signal is sampled by a device such as the receiver and detector 16 and 18 to reduce the modulation to its original form. The receiver and detector to be used must of course be compatible to the form of modulation being amplified. The output of the detector, which is in the same form as the original input modulating signal is compared to the input signal and if an error has been introduced in the course of modulating and transmitting a differential voltage will be produced by the comparator 20. The differential voltage controls a second modulating system 28 which may be of the same type as 10 and must be suitable to the form or system of modulation being employed. This supermodulates the carrier with a component either in phase or out of phase with the existing modulation to the extent necessary to insure that the output signal has a reproducable modulation component identical to the original modulation voltage.

The original modulation and supermodulation may be applied in the same circuit or the supermodulation may be applied at any stage before the final output.

While the foregoing discussion has been drawn on the modulation correction characteristics of this invention, it is obvious that modulation correction in an angular, frequency or phase, modulated system, when carried down to direct current modulation components, is inherently a frequency control system since a frequency drift is equivalent to a very low frequency modulation.

This invention may be used solely as an automatic frequency control system for angular modulation. In this case the higher audio frequencies could even be filtered out allowing the supermodulation or correction made by the second modulator to act only to restore the mean carrier frequency to its correct value. For automatic frequency control the second reactance tube or modulator can be replaced by a control motor or similar correcting device to vary the mean frequency of the oscillator.

The advantage of this system over conventional automatic frequency control systems is clear. In applicant's system the difference between the apparent output modulation envelope and the original modulating signal, including direct current, produces an error voltage which is always the exact drift of the angular modulation system. In standard systems only the mean drift can be obtained, over a relatively long period of time, by integrating the output of the discriminator or frequency detector.

What is claimed is:

In a frequency modulation system, a radio frequency generator, an audio frequency modulating input signal, a first modulating means comprising a reactance tube actuated by said modulating input signal for frequency modulating said radio frequency generator, means for amplifying the frequency modulations, means for receiving and detecting the modulation component of said amplified frequency modulated signal comprising a frequency modulation receiver, means for comparing the detected modulation component with said modulating input signal, and a second modulating means comprising a reactance tube actuated by the difference between said detected modulation component and said modulating input signal to correct any differences between the two.

References Cited in the file of this patent

UNITED STATES PATENTS

| | | |
|---|---|---|
| 2,590,784 | Moulton | Mar. 25, 1952 |
| 2,653,243 | McClellan | Sept. 22, 1953 |
| 2,692,947 | Spencer | Oct. 26, 1954 |